Oct. 5, 1965  A. KLEIN  3,210,262
APPARATUS FOR THE HYPOCHLORINATION OF WATER
Filed April 20, 1961
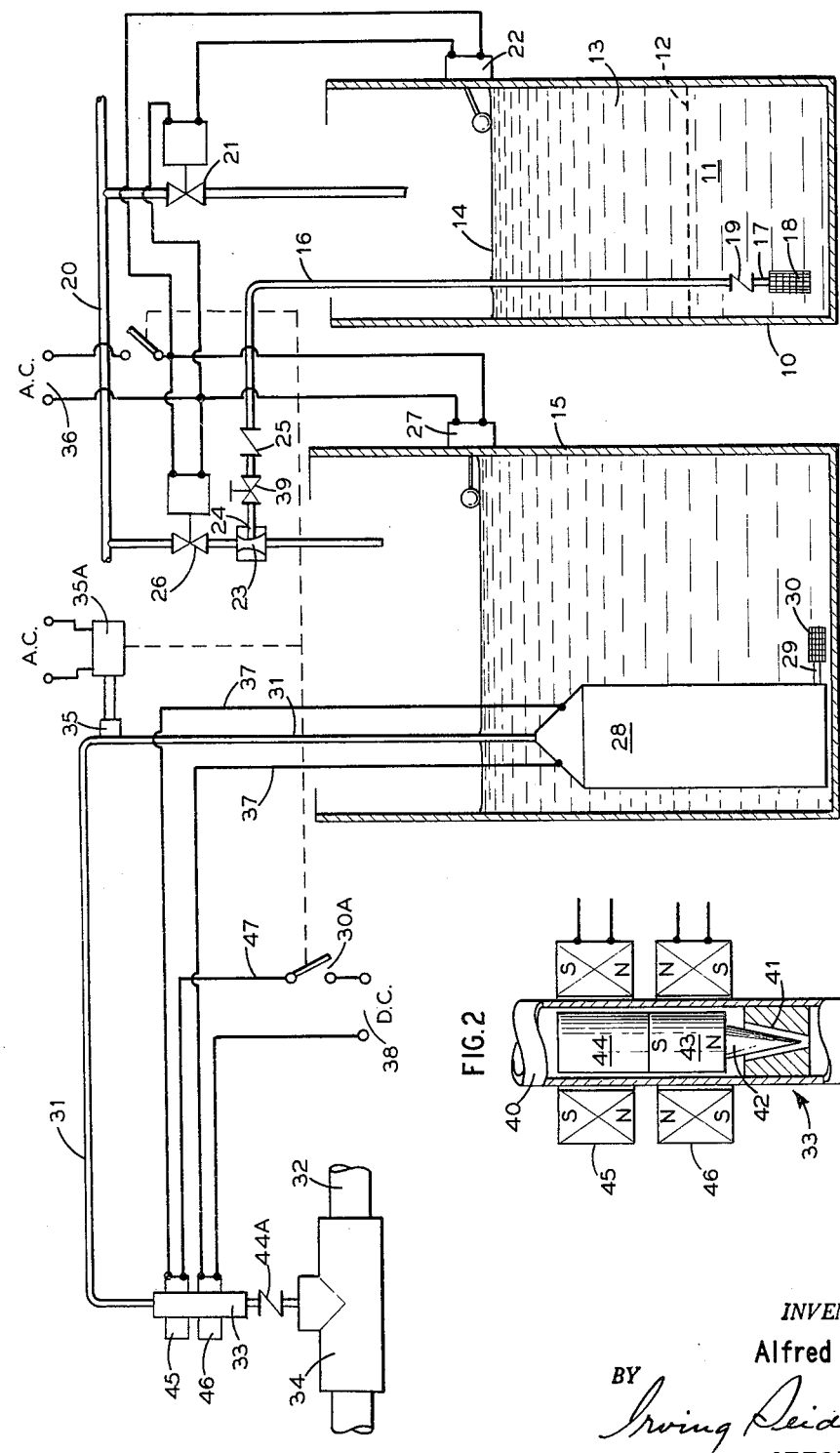
INVENTOR.
Alfred Klein
BY
Irving Seidman
ATTORNEY

United States Patent Office 3,210,262
Patented Oct. 5, 1965

3,210,262
APPARATUS FOR THE HYPOCHLORINATION
OF WATER
Alfred Klein, 1265 47th St., Brooklyn, N.Y.
Filed Apr. 20, 1961, Ser. No. 104,447
10 Claims. (Cl. 204—275)

This invention relates to a method and apparatus for introducing sodium hypochlorite into a water supply; and more particularly concerns an automatic procedure and means for electrolytically producing the sodium hypochlorite and passing the same into a water supply line.

An object of this invention is to provide an improved procedure and apparatus for electrolysing saline solutions in a continuous manner to produce sodium hypochlorite and to continuously introduce such hypochlorite into a water supply line; the operation being regulated by the flow of water in the supply line.

Another object of this invention is to provide improved apparatus for maintaining a saline solution at a predetermined concentration; for continuously transferring said solution to electrolysing means for continuously converting the same to sodium hypochlorite of determined concentration; and for continuously passing the hypochlorite to a water supply line.

A further object is to provide in apparatus of the character described improved valve means and controls therefor whereby the volume rate of feed of the hypochlorite to the water supply line may be at a substantially constant value despite fluctuations in the flow of water in the supply line; and whereby any rise in temperature in the electrolysing means may be compensated by increase in the rate of flow of saline solution to the electrolysing means.

Other objects of this invention will in part be obvious and in part hereinafter pointed out.

In the drawing FIG. 1 is a diagrammatic showing of apparatus embodying the invention;

FIG. 2 is a vertical sectional view showing a control valve forming a part of the apparatus.

As shown in FIG. 1, the apparatus embodying the invention comprises a tank 10 filled with common salt 11 to a determined level 12, and water 13 to a predetermined level 14 to form within such tank 10 a saturated saline solution. Additional salt is periodically added to tank 10 to insure a saturated solution at all times.

Such saline solution is fed to a proportioning tank 15 by means of a conduit 16 which extends at one end 17 below the salt level 12 with an inlet strainer 18 of stainless steel at conduit end 17. A foot valve 19 is in conduit end portion 17, for the purpose later appearing.

The water level 14 is maintained within tank 10 by admitting water from a water line 20 by way of a solenoid controlled valve 21; the valve 21 in turn being regulated by suitable float operated switch 22.

The saline solution from tank 10 is fed to proportioning tank 15 for regulated dilution with water by suction means in the form of a venturi 23; the conduit 16 being connected to the suction side thereof as at 24, with an interposed check valve 25. Venturi 23 is operated by means of water from line 20 by way of a second solenoid operated valve 26 controlled by a float operated switch 27 on tank 15.

Within proportioning tank 15 is an electrolysing chamber 28 formed of plastic or the like, and having interiorly thereof the conventional anodes and cathodes of graphite, not shown. Chamber 28 has at its lower end an inlet 29 and inlet strainer 30. A conduit 31 extends upwardly from the upper end of chamber 28 for connection to a water supply line 32 which carries water to be treated with sodium hypochlorite. Such connection is made through a valve generally indicated at 33 and a venturi 34, whereby the action of said venturi 34 is effective to draw the sodium hypochlorite from chamber 28 by way of conduit 31 and valve 33.

A pressure responsive switch 35 in conduit 31 controls a switch 35A in circuit with the solenoid operated valves 21, 26 and a current supply 36, whereby water is supplied to tanks 10 and 15 only when water is flowing in supply line 32, and thus is effective to operate switch 35 and close switch 35A.

Direct current is supplied to electrolysing chamber 28 for connection to the electrodes thereof, by way of lines 37 and a current source as at 38, through a contact 30A of switch 35A.

It will be apparent, that with the water flowing in supply line 32, solenoid valves 21, 26 are operated to pass water to tanks 10, 15 where the levels thereof are regulated by float operated switches 22, 27 respectively. As water flows into tank 15, simultaneously operating venturi 23, concentrated saline solution is drawn from tank 10 by way of conduit 16 and such solution is proportioned to the inflowing water from line 20. A needle valve 39 at the suction side of venturi 23 may be adjusted to vary the rate of flow of saline solution into tank 15. When such flow is stopped, as by operation of the float operated switch 27, back flow to tank 10 is prevented by check valve 25 and foot valve 19.

The saline solution in tank 15 enters chamber 28 by way of inlet 29 and rises in said chamber under the influence of venturi 34 which is connected to the upper end of chamber 28 by conduit 31. As said saline solution passes through chamber 28, portions thereof are electrolytically converted to sodium hypochlorite, the concentration thereof being regulated in accordance with the rate of flow of saline solution, the concentration of said solution and the voltage and amperage of the electrolysing current.

The resultant sodium hypochlorite solution is sucked from chamber 28 by means of venturi 34, by way of conduit 31 and thus passes into the water supply line 32.

It is noted that solenoid operated valve 26 is turned on to allow the water from line 20 to pass through venturi 23 at full pressure, to operate the same. Whenever saline solution in tank 15 reaches a predetermined level, valve 26 is closed through operation of switch 27 and is reopened when the solution drops below said level. In turn, as saline solution is drawn from tank 10, switch 22 operates to admit water by way of valve 21 to provide additional saline solution.

Since the rate of flow of water in supply line 32 may not be constant, and as it is desirable to maintain the volume rate of flow through valve 33, said valve 33 includes means for regulating such flow. Accordingly, as shown in FIG. 2, valve 33 comprises an elongated housing 40 having a conical valve seat 41 at the lower end thereof and a conical valve 42 for moving towards and away from seat 41; however in its lower position the valve is incompletely closed. Extending upwardly from valve 42 is a permanent magnet 43 and extending upwardly from magnet 43 is a hollow plastic portion 44 which provides a buoyant effect to the valve. A check valve 44A prevents back feed from main line 32 when the system is shut down.

Exteriorly of housing 40 are located a pair of magnetizing coils 45, 46 arranged for movement toward and away from each other along said housing. Coils 45, 46 are arranged with similar poles in opposed relation and are connected in circuit with current source 38 by way of conductors 47 and 37.

Water in line 32 moves at varying velocities depending on the demand. As a result of such velocity changes in line 32, the vacuum at valve 33 will vary in respect to a predetermined value. When the velocity in line 32 increases, thereby increasing the vacuum above said valve, the action of coil 45, 46 will be overcome by the pull down on valve 42. When said velocity decreases relative to the predetermined value, then coils 45, 46 and float 44 will cause the valve 42 to move upwardly.

Thus, there is automatic compensation of the volume rate of flow to maintain the predetermined value substantially constant, despite fluctuations in the velocity of the water flowing in line 32.

Also, since the electrolysis of the saline solution in chamber 28 is exothermic in character, an increase in temperature in said chamber increases the conductivity of the saline solution, which is in series circuit with coils 45, 46, thereby increasing the current flow to such coils with a consequent increase in magnetic field intensity. This in turn increases the opening in valve 33 and increases the volume rate of flow of saline solution into the interior of chamber 28, and thus cooling the same.

It will be apparent that coils 45, 46 act in opposition to the force due to the vacuum produced by venturi 34. By moving the coils 45, 46 toward or away from each other, the resultant magnetic field may be regulated so as to adjust the compensating action of valve 33 for selected values of the volume rate of flow therethrough.

As various changes might be made in the embodiment of the invention described herein without departing from the spirit thereof, it is understood that all matter shown or described herein is illustrative and not limiting except as set forth in the appended claims.

What is claimed is:

1. Apparatus for introducing sodium hypochlorite into a water supply line so that the flow rate of sodium hypochlorite added is relatively independent of the flow rate in said water supply line and including a source of saturated saline solution and a chamber for holding a dilute saline bath, said apparatus comprising electrolyzing means immersed in said dilute saline bath and adapted to convert saline solution into sodium hypochlorite by passing electric current therethrough; means for transferring regulated amounts of said saturated saline solution from said source in response to diluting water flow so as to mix therewith to supply said dilute saline bath; and regulating means responsive to the flow rate in said water supply line to draw a constant flow rate of sodium hypochlorite solution from said electrolyzing means and pass it to said supply line, said regulating means comprising a valve having an orifice variable within a range of open values and means sensitive to flow rate in said supply line adapted to increase and decrease the cross-section of said orifice in direct response to variation in said rate; and means responsive to the amount of electric current flow through said electrolyzing means by increasing and decreasing said orifice cross-sectional area with increasing and decreasing electric current respectively.

2. Apparatus for introducing sodium hypochlorite into a water line so that the flow rate of sodium hypochlorite added is relatively independent of the flow rate in said water supply line and including a source of saturated saline solution and a chamber for holding a dilute saline bath, said apparatus comprising electrolyzing means immersed in said dilute saline bath and adapted to convert saline solution into sodium hypochlorite by passing electric current therethrough; means for transferring regulated amounts of said saturated saline solution from said source in response to diluting water flow so as to mix therewith to supply said dilute saline bath; and regulating means responsive to the flow rate in said water supply line to draw a constant flow rate of sodium hypochlorite solution from said electrolyzing means and pass it to said supply line, said regulating means comprising a valve having an orifice variable within a range of open values and venturi means in said supply line having a suction side thereof communicating with said valve adapted to increase and decrease the cross-section of said orifice in direct response to variation in the flow rate through said supply line; and means responsive to the electric current flow in said electrolyzing means by increasing and decreasing said orifice cross-sectional area with increasing and decreasing electric current respectively.

3. Apparatus according to claim 1 wherein said means responsive to the amount of electric current flow comprises a member responsive to magnetic field and an electromagnet in circuit with said electrolyzing means for producing a magnetic field.

4. Apparatus according to claim 1 wherein said means sensitive to flow rate in the supply line further comprises a valve plunger movable axially within said regulating means so as to increase and decrease said orifice and venturi means in said supply line having the suction side thereof communicating with said plunger so as to attract said plunger upon increased flow rate in said supply line so as to decrease said orifice; and wherein said means responsive to the amount of electric current flow comprises a magnetically sensitive body associated with said plunger and solenoid electromagnet means in circuit with said electrolyzing means and coaxially disposed about said plunger.

5. Apparatus for introducing sodium hypochlorite into a water supply line so that the flow rate of sodium hypochlorite added is relatively independent of the flow rate in said water supply line and including a first tank containing sodium chloride and a second tank for holding a dilute saline bath, said apparatus comprising electrolyzing means in said second tank adapted to convert saline solution into sodium hypochlorite by passing electric current therethrough; means for passing water into said first tank in regulated amounts for forming a saturated saline solution therein; means for transferring regulated amounts of said saturated solution from said first tank in response to diluting water flow so as to mix therewith and flow into said second tank supplying a dilute saline bath therein; and regulating means responsive to the flow rate in said water supply line to draw a constant flow rate of sodium hypochlorite solution from said electrolyzing means and pass it to said supply line, said regulating means comprising a valve orifice communicating said sodium hypochlorite solution to said supply line, a valve plunger member movable within a range of axial positions relative to said orifice so as to increase and decrease the effective area of said orifice, and venturi means in said supply line having the suction side thereof communicating with said orifice so as to exert a vacuum upon said plunger proportional to the flow rate in said supply line; and means sensitive to the amount of electric current flow in said electrolyzing means comprising a magnetically sensitive body associated with said plunger and solenoid electromagnet means in the circuit of said electrolyzing means and mounted coaxially with said plunger and adapted to attract and repel said plunger axially in direct response to variation in said electric current so as to increase and decrease said orifice cross-sectional area in response to increasing and decreasing electric current respectively, the magnetic force of said solenoid means acting to bias the plunger axially against forces other than change in said electric current.

6. Apparatus according to claim 5 wherein said means for transferring solution from said first tank to said second tank comprises auxiliary venturi means in an auxiliary water supply line carrying diluting water, the suction side of said auxiliary venturi being adapted to draw said solution from said first tank to be mixed with said diluting water, and a valve in circuit with said drawn solution.

7. Apparatus according to claim 6 further wherein valve means control the flow of water to each of said tanks, said valve means being electrically actuatable, a conduit means connecting said electrolyzing means to said supply line, and switch means connected to said conduit and controlling said last mentioned valve means and said electrolyzing means, said switch means opening when no water flows in said supply line, thereby preventing damage in the event of water supply failure.

8. Apparatus according to claim 5 wherein said solenoid electromagnet comprises two portions having opposed poles movably holding said plunger axially at null thereinbetween against displacement therefrom.

9. Apparatus according to claim 8 wherein said electromagnet portions are axially adjustable so as to allow change of said null point and thereby the charge rate of sodium hypochlorite into said supply line.

10. Apparatus according to claim 5 wherein said plunger and said orifice are mutually conical in outline, the closest approach of said plunger to said orifice thereby forming an annular flow passage considerably diminished in area from that of the furthest approach.

References Cited by the Examiner

UNITED STATES PATENTS

| | | | |
|---|---|---|---|
| 751,986 | 2/04 | Kartzmark | 204—232 |
| 892,486 | 7/08 | Woolf | 204—149 |
| 2,093,770 | 9/37 | Billiter | 204—151 |
| 2,269,393 | 1/42 | Crampton | 210—62 |
| 2,701,790 | 2/55 | Goument | 204—232 |
| 2,873,236 | 2/59 | Ferris | 204—95 |

WINSTON A. DOUGLAS, *Primary Examiner.*

JOHN R. SPECK, MURRAY TILLMAN, JOHN H. MACK, *Examiners.*